UNITED STATES PATENT OFFICE.

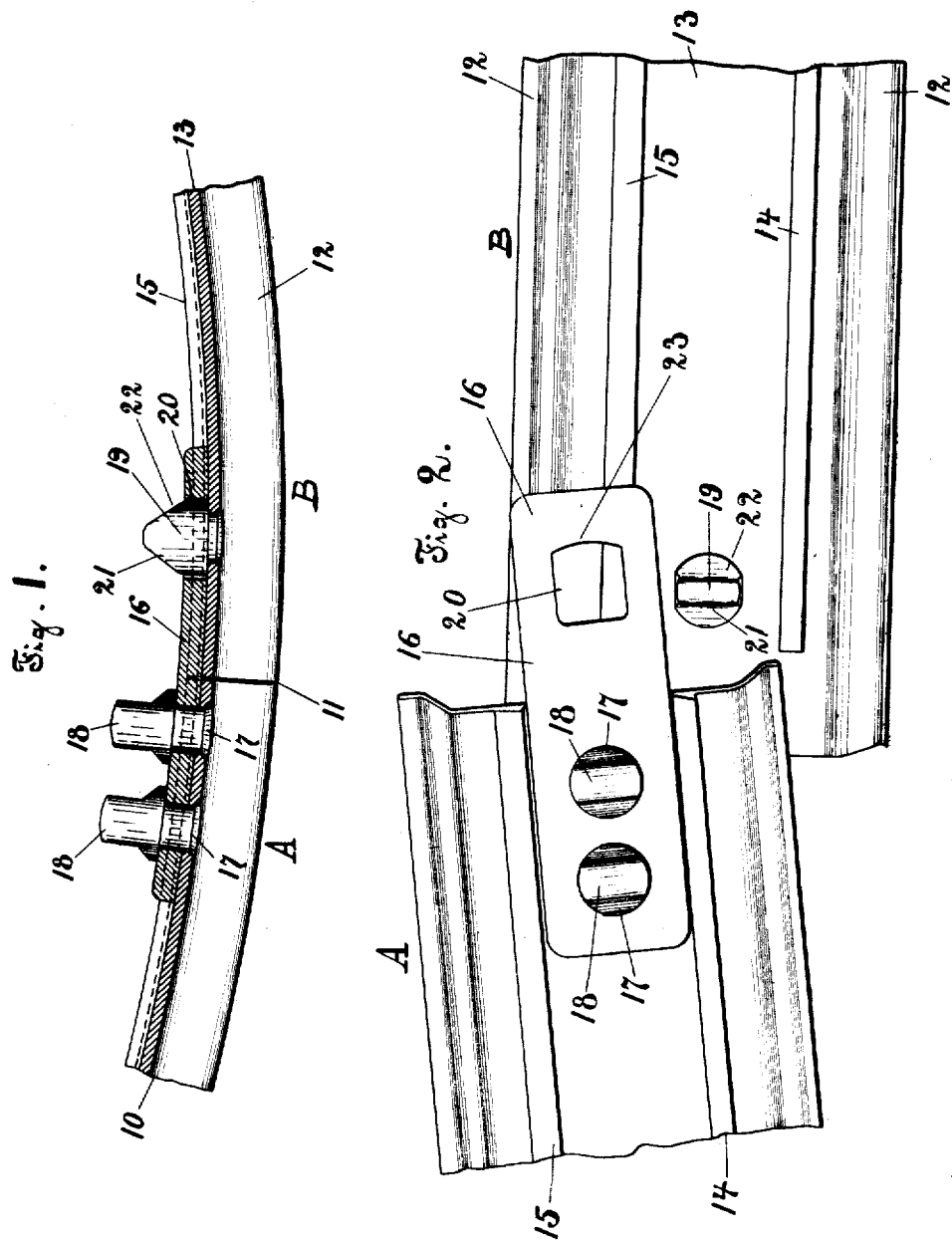

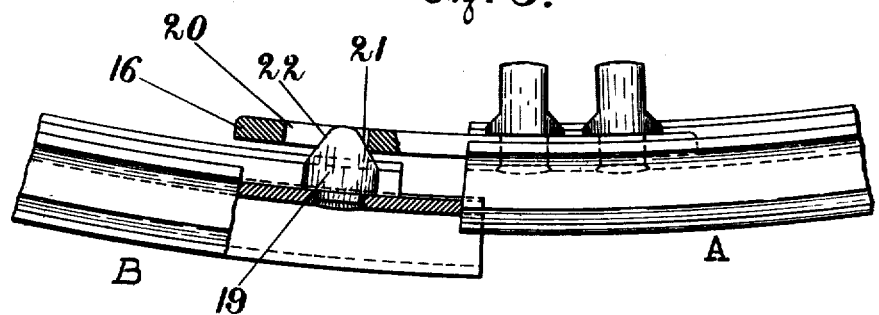
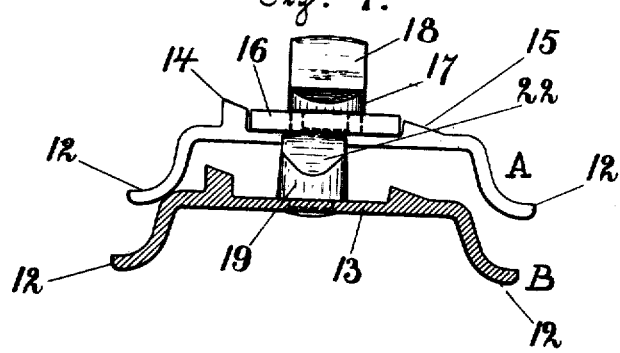
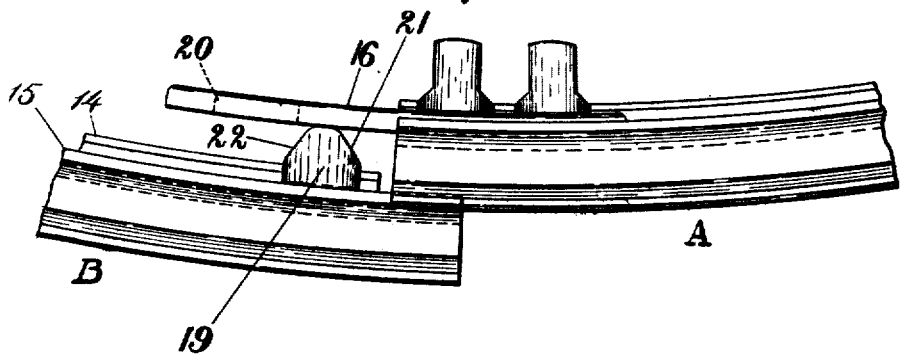

JAMES H. WAGENHORST, OF AKRON, OHIO, ASSIGNOR TO THE B. F. GOODRICH COMPANY, OF NEW YORK, N. Y., A CORPORATION OF NEW YORK.

DEMOUNTABLE RIM.

1,258,065.     Specification of Letters Patent.     Patented Mar. 5, 1918.

Application filed April 28, 1916. Serial No. 94,138.

*To all whom it may concern:*

Be it known that I, JAMES H. WAGENHORST, a citizen of the United States, residing at Akron, in the county of Summit and State of Ohio, have invented certain new and useful Improvements in Demountable Rims, of which the following is a specification.

This invention relates to transversely-split demountable rims for holding pneumatic tires, and its object is to provide a simple and inexpensive form of construction for locking the rim ends together and enabling them to be readily connected and disconnected.

Of the accompanying drawings,

Figure 1 is a longitudinal sectional view of the ends of a demountable rim provided with a preferred form of my improved connecting device, with the rim ends in their normal or locked position.

Fig. 2 is a reverse plan view showing the rim ends overlapped and relatively displaced laterally.

Fig. 3 is a side elevation, partly in section, illustrating the first stage of rim-end separation, or the final stage in connecting the ends.

Fig. 4 is a transverse section showing a later stage of separation or an earlier stage of connection.

Fig. 5 is a side elevation showing the parts in the same position as in Fig. 4.

The demountable rim 10 here shown is of the single-piece, channeled type, transversely split at 11 and formed with outwardly turned flanges 12 integral with the rim base 13 for the reception of a tire having straight-side beads, the single-piece rim being more particularly adaptable for that style of tire, although usable with the clencher type, in which case it would have hooked flanges as will be readily understood without illustration. The means of attachment to the wheel felly may be of any suitable type, the rim in this case being shown as formed on the inner side of its base with deep and shallow conical flanges 14, 15, adapted to fit complemental surfaces on the felly or felly band, and held in place by suitable bolted clamps engaging the deeper flange 14.

The rim ends are designated as A and B respectively. On the under side of the rim end A, between the seating flanges 14, 15, is rigidly affixed a stiff locking plate 16 attached by rivets 17 whose inner ends (one or both) I prefer to form as driving lugs 18 adapted to engage with a complemental part on the felly to keep the rim from creeping circumferentially, the two lugs in the particular illustration being adapted to embrace between them a cross bolt on a channeled metal felly.

The projecting end of the locking plate 16 overlaps the rim end B, to which is riveted an inwardly-projecting locking stud or dowel 19 occupying a hole 20 in the locking plate. This stud is formed with oppositely tapered faces 21, 22 imparting to the inner end of the stud the shape of a transverse radial wedge, and its remaining portion, including the base and lateral sides, is circular in outline—either cylindrical or slightly coned as seen in Fig. 4. The aperture 20 is nearly rectangular, but is convexly curved on its far side at 23.

The abutting faces of the rim ends at the split 11, I prefer to form in a substantially radial and axial plane as shown, or, in other words, to make the rim ends "square" with each other, in order to avoid any liability of the rim ends to become displaced either radially or laterally through the contracting tendency of the rim caused by the pressure of the inflated tire thereon, or by its own elasticity.

The deeper rim flange 14 on the rim end B is terminated short of the extremity of the rim to permit the insertion of a prying tool, such as a screw-driver, between the locking plate 16 and the inner side of rim end B.

The height of the locking stud B is such that relative lateral displacement of the rim ends cannot take place to any substantial extent until the bead flanges 12 on rim end A have been so far displaced in a radial direction that they are ready to clear the rim base 13 on rim end B, as illustrated in Fig. 4. This feature greatly facilitates the operation of applying the rim to and removing it from the tire.

In operation, assuming that the rim ends are alined and interlocked, as shown in Fig. 1, and it is desired to collapse the rim for its removal from or application to the pneumatic tire, the operator inserts the end of a screw-driver 25, or other suitable tool, between the locking plate 16 and the base of rim end B, and begins to pry the ends apart in a radial direction until the plate 16 has cleared the end of stud 19, as shown in Figs. 4 and 5. The flare of the bead flanges 12 allows their ends to pass each other during the early stages of this movement and produce an overlap of the rim ends as indicated in Fig. 3 by reason of the contracting tendency of the rim, which overlapping is permitted by the beveled face 21 of stud 19 as the locking plate rides up on said stud, until finally the locking stud comes out of the hole in plate 16 and said plate rides over the top of said stud, as seen in Fig. 5. At this stage, the bead flanges 12 on rim end A are ready to clear the base of the rim end B, and a continuation of the prying action in a lateral direction permits the rim end A to be disconnected from rim end B and from the tire sufficiently to initiate the progressive peeling of the rim from inside the tire which finally results in its complete removal. In applying a rim to a tire, the foregoing operations are reversed, the rim end B being first applied while the ends are displaced both radially and laterally, the tire being crowded into the rim by stepping on it or otherwise, and the rim ends finally brought into alinement laterally and pried apart circumferentially until they fall into radial alinement, with the plate 16 and stud 19 interlocked as in Fig. 1. The tapered stud face 22 facilitates the locking and unlocking action, since the rim end A, owing to the height of the flanges 12, retreats from the end B slightly during the first part of the radial separating movement, until the abutting ends have so far cleared each other as to permit an overlap.

I claim:

1. A one-piece rim for vehicle wheels transversely split substantially at right angles to the sides and having coacting members on the respective rim-ends adapted to slide on each other when the rim ends are overlapped, for spacing said rim ends in a radially-separated and laterally-cleared relation.

2. A demountable tire-supporting rim for vehicle wheels transversely split in a substantially radial and axial plane, and having integral base and bead-retaining flanges, a radial-locking member on one rim end overlapping the other rim end, and a complemental locking member on said other rim end of such height as to prevent relative lateral displacement of the ends until the flanges on one end have substantially cleared the base on the other during radial displacement.

3. A demountable tire-supporting rim for vehicle wheels transversely split in a substantially radial and axial plane and having an integral base and bead-retaining flanges, a radial-locking plate rigidly mounted on one rim end and overlapping the other end, said plate having a locking aperture, and a radial stud on the other rim end occupying said aperture and of such height as to remain therein until the flanges on one rim end have cleared the base on the other during radial separation.

4. A demountable tire rim transversely split in a substantially radial and axial plane, a radial-locking plate rigidly affixed to one rim end and overlapping the other, and a radial-locking stud on the other rim end occupying an aperture in said plate and of such height as to space the rim-ends in laterally-cleared relation when they are radially separated.

5. A demountable tire rim having ends transversely split in a substantially radial and axial plane and adapted to overlap when relatively displaced radially, an apertured radial-locking plate rigidly affixed to one rim end and overlapping the other, and a radial-locking, rim end spacing stud on said other rim end occupying the aperture in said plate and tapered on the side toward the first-said rim end to permit said overlapping of the ends.

6. A demountable tire-carrying rim transversely split in a radial plane substantially coinciding with the wheel axis and having integral base and bead-retaining flanges, a rigid, apertured radial-locking plate affixed to one rim end and overlapping the other, and a radial-locking stud on the other rim end occupying the aperture in said plate and tapered on the side toward the first-said rim end, said stud being of such height as to prevent the lateral separation of the rim ends until the flanges on the one having the locking plate have substantially cleared the base on the end having the locking stud, during radial separation.

7. A demountable tire rim transversely split in a substantially radial and axial plane, an apertured radial-locking plate on one rim end overlapping the other, and a stud on the other end occupying the aperture in said plate and tapered on the side remote from the first-said rim end.

8. A transversely-split demountable tire rim having a radial-locking plate rigidly mounted on one rim end and overlapping the other rim end, said plate formed with a locking aperture, and a radial-locking stud on the other rim end occupying said aperture, said stud having converging convex faces imparting a wedge shape thereto.

9. A transversely-split demountable tire rim having a radial-locking plate rigidly attached to the bottom of the rim base on one end and overlapping the other rim end, a radial-locking member on the other rim end coöperating with said plate, and a supporting flange on the bottom of the rim base adapted to coöperate with the felly and terminating on one end short of the split, adjacent to the overlapping part of the locking plate, to permit the insertion of a prying tool between said plate and the base of the connecting rim end.

In testimony whereof I have hereunto set my hand this 26 day of April 1916.

JAMES H. WAGENHORST.